(12) United States Patent
Umesawa

(10) Patent No.: US 10,839,479 B2
(45) Date of Patent: Nov. 17, 2020

(54) IMAGING APPARATUS, IMAGE PROCESSING APPARATUS, IMAGE PROCESSING METHOD, AND MEDIUM

(71) Applicant: CANON KABUSHIKI KAISHA, Tokyo (JP)

(72) Inventor: Takeo Umesawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 16/351,863

(22) Filed: Mar. 13, 2019

(65) Prior Publication Data

US 2019/0325552 A1     Oct. 24, 2019

(30) Foreign Application Priority Data

Mar. 23, 2018   (JP) ................................ 2018-056749

(51) Int. Cl.
*G06T 3/00* (2006.01)
*G06T 5/00* (2006.01)
*H04N 5/232* (2006.01)

(52) U.S. Cl.
CPC .......... *G06T 3/0018* (2013.01); *G06T 3/0062* (2013.01); *G06T 5/006* (2013.01); *H04N 5/23238* (2013.01)

(58) Field of Classification Search
CPC ..... G06T 3/0018; G06T 3/0062; G06T 5/006; H04N 5/23238
See application file for complete search history.

(56) References Cited

U.S. PATENT DOCUMENTS

| 6,346,967 | B1* | 2/2002 | Gullichsen | ............ | G06T 3/0018 |
| | | | | | 348/207.99 |
| 8,155,477 | B2 | 4/2012 | Utsugi | | |
| 8,238,695 | B1* | 8/2012 | Davey | .................. | H04N 5/2628 |
| | | | | | 382/299 |
| 2009/0074323 | A1 | 3/2009 | Utsugi | | |
| 2017/0019595 | A1* | 1/2017 | Chen | .................. | H04N 5/23293 |
| 2017/0070674 | A1* | 3/2017 | Thurow | ............... | H04N 13/243 |
| 2019/0068890 | A1* | 2/2019 | Kazama | ............. | H04N 5/23238 |
| 2020/0021727 | A1* | 1/2020 | Ikeda | ....................... | H04N 7/18 |

FOREIGN PATENT DOCUMENTS

WO   2007/129446 A1   11/2007

* cited by examiner

*Primary Examiner* — David F Dunphy
(74) *Attorney, Agent, or Firm* — Venable LLP

(57) ABSTRACT

There is provided with an imaging apparatus. An imaging unit captures an image with use of a fisheye lens. An image conversion unit converts an input image obtained from the imaging unit into a panoramic image, by performing geometrical conversion on the input image such that a region of the input image in which a distance from a point on an optical axis is smaller than a set distance becomes a perspective projection, and such that a region in which the distance is larger than the set distance becomes a stereographic projection. The set distance is determined based on an accuracy of fisheye lens distortion correction with respect to the fisheye lens.

14 Claims, 11 Drawing Sheets

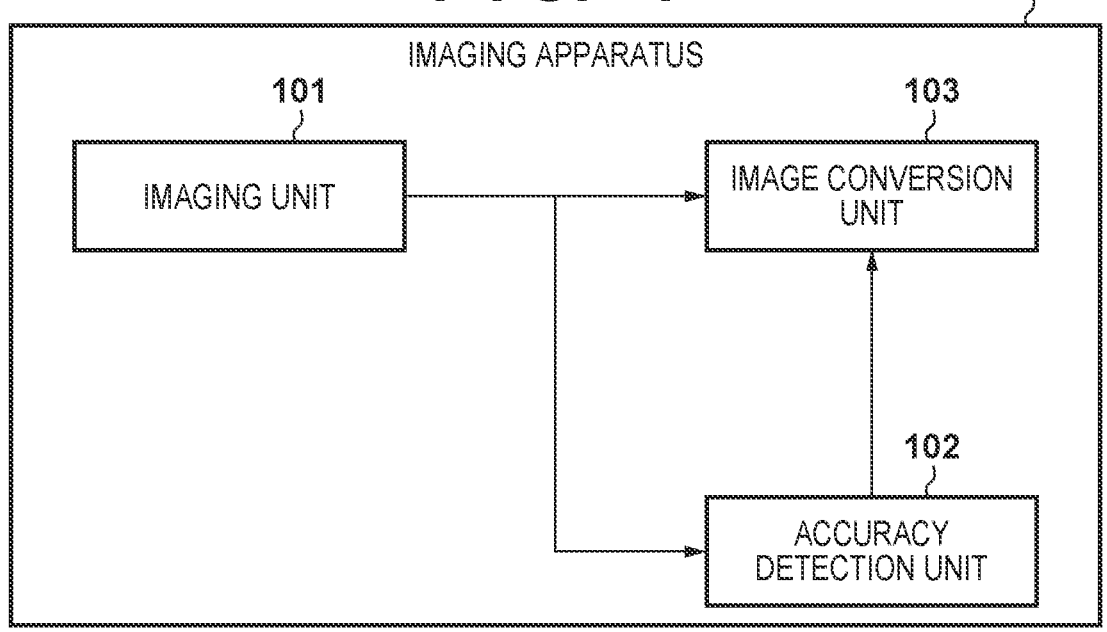

IMAGING APPARATUS, IMAGE PROCESSING APPARATUS, IMAGE PROCESSING METHOD, AND MEDIUM

BACKGROUND OF THE INVENTION

Field of the Invention

The present invention relates to an imaging apparatus, an image processing apparatus, an image processing method, and a medium, and in particular to geometrical conversion processing for converting a fisheye image into a panoramic image.

Description of the Related Art

An omnidirectional monitoring camera is a monitoring camera that is capable of capturing an omnidirectional image by using a fisheye lens. Generally, a fisheye lens forms an object image on an image sensor in accordance with a method such as stereographic projection, equidistant projection, equisolid angle projection, or orthographic projection. Unlike a normal perspective projection method, an object image obtained using these methods does not have a shape that is homothetic to the object. Accordingly, a portion is cut out from the image obtained using the fisheye lens, the cut-out portion is converted into a perspective projection image that is easier for the user to view, and this perspective projection image is output. This conversion makes it possible for straight line components of the object to be more accurately reproduced in the output image.

However, it is known that a characteristic of perspective projection images is that magnification distortion occurs in objects that appear in end portions of such images, due to the fact that the magnification ratio is different in the diameter direction and the circumferential direction. International Publication No. 2007/129446 proposes a correction method for suppressing magnification distortion while also maintaining high straight line reproducibility.

SUMMARY OF THE INVENTION

According to an embodiment of the present invention, an imaging apparatus comprises: an imaging unit configured to capture an image with use of a fisheye lens; and an image conversion unit configured to convert an input image obtained from the imaging unit into a panoramic image, by performing geometrical conversion on the input image such that a region of the input image in which a distance from a point on an optical axis is smaller than a set distance becomes a perspective projection, and such that a region in which the distance is larger than the set distance becomes a stereographic projection, wherein the set distance is determined based on an accuracy of fisheye lens distortion correction with respect to the fisheye lens.

According to another embodiment of the present invention, an image processing apparatus comprises: an image conversion unit configured to obtain an input image that was captured with use of a fisheye lens, and perform correction on the input image such that a shape of an image of an object is brought closer to a shape that is homothetic to the object, wherein an intensity of the correction is weaker in a peripheral portion of the input image than in a central portion of the input image.

According to still another embodiment of the present invention, an image processing method comprises: obtaining an input image which is captured with use of a fisheye lens; and converting the input image into a panoramic image, by performing geometrical conversion on the input image such that a region of the input image in which a distance from a point on an optical axis is smaller than a set distance becomes a perspective projection, and such that a region in which the distance is larger than the set distance becomes a stereographic projection, wherein the set distance is determined based on an accuracy of fisheye lens distortion correction with respect to the fisheye lens.

According to yet another embodiment of the present invention, a non-transitory computer-readable medium stores a program which, when executed by a computer comprising a processor and a memory, causes the computer to: obtain an input image which is captured with use of a fisheye lens; and convert the input image into a panoramic image, by performing geometrical conversion on the input image such that a region of the input image in which a distance from a point on an optical axis is smaller than a set distance becomes a perspective projection, and such that a region in which the distance is larger than the set distance becomes a stereographic projection, wherein the set distance is determined based on an accuracy of fisheye lens distortion correction with respect to the fisheye lens.

Further features of the present invention will become apparent from the following description of exemplary embodiments (with reference to the attached drawings).

BRIEF DESCRIPTION OF THE DRAWINGS

FIG. 1 is a block diagram of an imaging apparatus according to an embodiment.

DESCRIPTION OF THE EMBODIMENTS

Figure 2A:
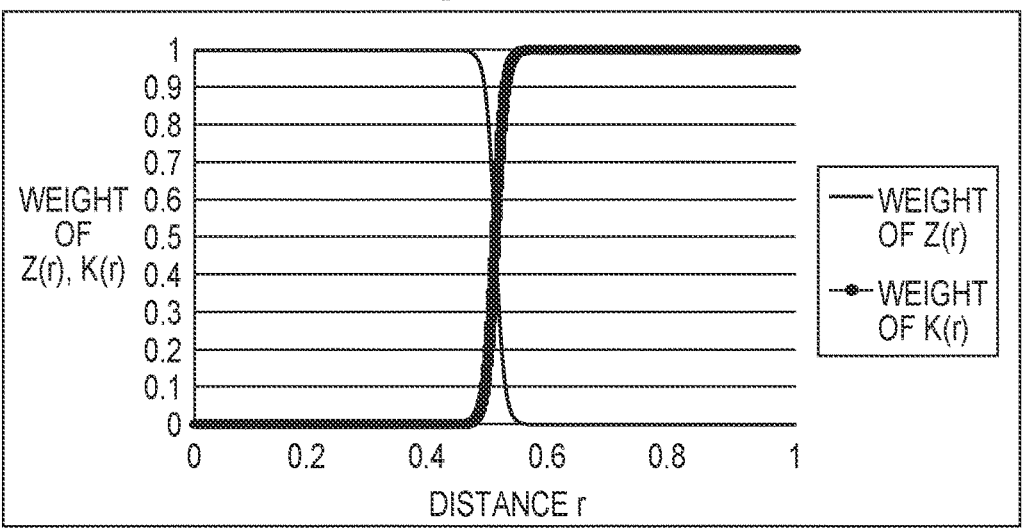
FIGS. 2A to 2E are diagrams illustrating weighting relationships according to an embodiment.

It was discovered that when regions near the ends of an omnidirectional image are converted into a perspective projection image, the shapes of objects in such regions are not homothetic to the shapes of the actual objects, and image flow becomes noticeable. The inventors of the present invention posited that the reason for this is that correction processing performed on the captured image to compensate for lens distortion results in error that is dependent on the correction accuracy. In particular, regions near the ends of an omnidirectional image become greatly magnified when converted into a perspective projection image, and it was posited that the aforementioned error thus also become magnified and easier to see. It was discovered that this issue becomes significant in monitoring cameras. The inventors of the present invention posited that the reason for this is that, in monitoring cameras, the accuracy of lens distortion compensation processing is not stable due to, for example, change in the distortion ratio caused by dome degradation or the like, or change in the distortion ratio during nighttime IR light emission.

One embodiment of the present invention provides technology for improving the quality of an obtained image by achieving balance between straight line reproducibility and the suppression of an increase in error in the peripheral portions of the image in geometrical conversion processing for conversion to a perspective projection.

The following describes embodiments of the present invention with reference to the drawings. Note that the configurations shown in the following embodiments are merely examples, and the present invention is not intended to be limited to the illustrated configurations.

First Embodiment

FIG. 1 is a block diagram showing an example of the configuration of an imaging apparatus according to a first embodiment. An imaging apparatus 100 can convert a fisheye image into a panoramic image and output the panoramic image. Here, "fisheye image" refers to an image obtained using a fisheye lens. There are no particular limitations on the method for capturing the fisheye image. For example, an object image in the fisheye image may be an orthographic projection image, a stereographic projection image, an equidistant projection image, or an equisolid angle projection. Also, "panoramic image" refers to an image in which at least a portion of the fisheye image has been corrected such that the shape of an object image is brought closer to a shape that is homothetic to the object. For example, the panoramic image may be an image obtained by performing geometrical conversion on a portion of the fisheye image so as to be brought closer to a perspective projection image.

The imaging apparatus 100 includes an imaging unit 101, an accuracy detection unit 102, and an image conversion unit 103. The imaging unit 101 generates an input image by capturing an image. The imaging unit 101 outputs the generated input image to the accuracy detection unit 102 and the image conversion unit 103. In the present embodiment, the imaging unit 101 has a fisheye lens, and can capture a fisheye image. The imaging unit 101 can also generate an omnidirectional image. In the present embodiment, the fisheye lens provided in the imaging unit 101 is a stereographic projection lens.

Figure 8A:
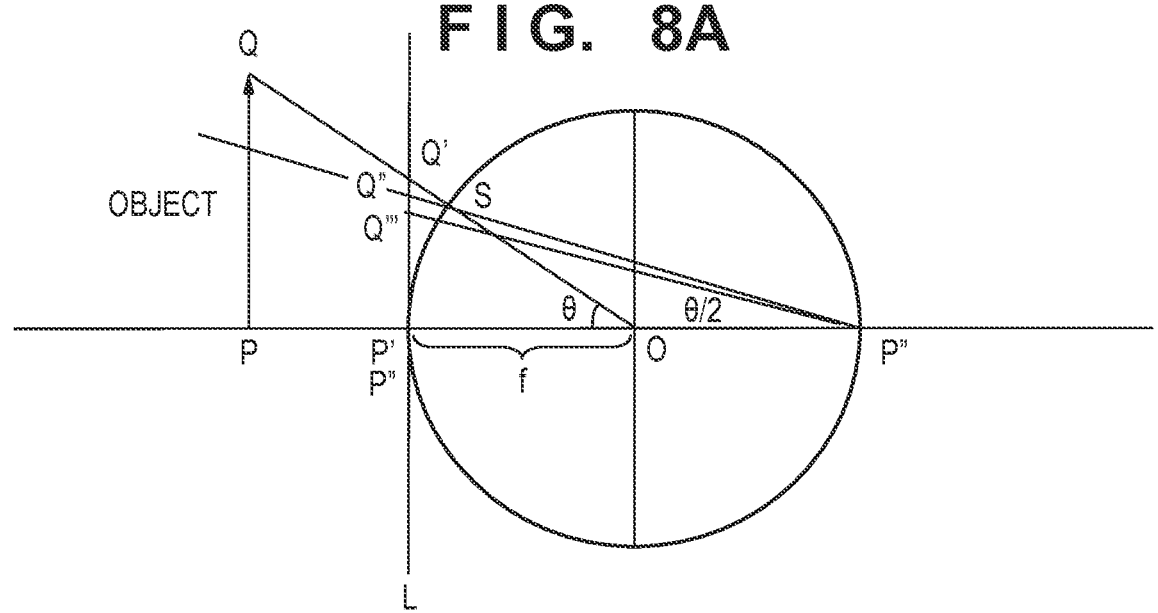
FIG. 8A is a diagram illustrating processing according to an embodiment, and illustrates a projection method.

As shown in FIG. 8A, when an object PQ is projected onto a projective plane L by stereographic projection, the object PQ becomes an image P'Q''' in the stereographic projection image. However, in the example in FIG. 8A, due to distortion of the lens, the object PQ becomes an image P''Q'' in the actual input image that is obtained by the stereographic projection method.

Figure 8B:
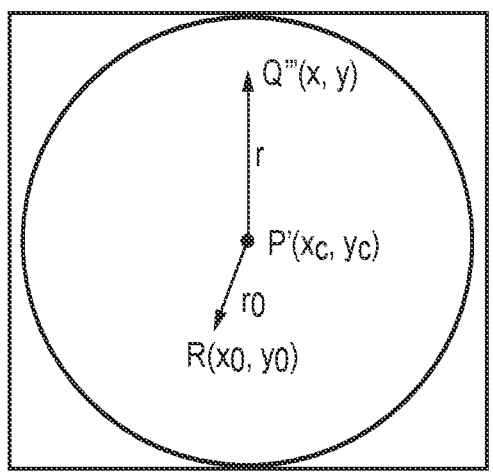
FIG. 8B is a diagram illustrating processing according to an embodiment, and shows a captured image.

More specifically, in FIG. 8A, the optical axis is a straight line PO, and is at the center of the projective plane L. Accordingly, the point on the optical axis (hereinafter simply referred to as the "center point") in the input image is denoted by a point P' at coordinates $(x_c, y_c)$ as shown in FIG. 8B. Also, the center point in the stereographic projection image is denoted by a point P''' at coordinates $(x'_c, y'_c)$ as shown in FIG. 8C.

Figure 8C:
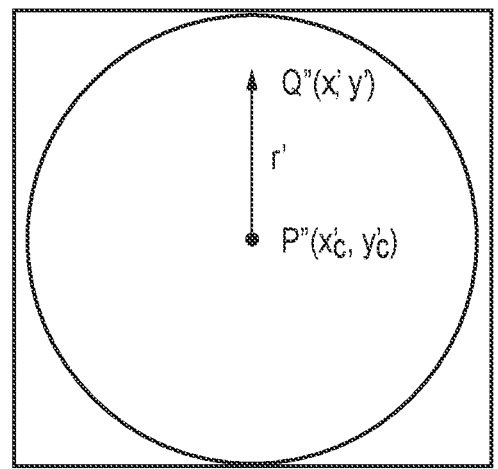
FIG. 8C is a diagram illustrating processing according to an embodiment, and shows an image that has been subjected to stereographic projection.

In this way, a point Q'''(x,y) in the input image shown in FIG. 8B corresponds to a point Q''(x',y') in the stereographic projection image shown in FIG. 8C. The length of a straight line Q'''P' in the input image shown in FIG. 8B is denoted by r, and the length of a straight line Q''P''' in the stereographic projection image shown in FIG. 8C is denoted by r'.

Here, a point Q'''(x,y) of an object in the input image and a point Q''(x',y') of the same object in the stereographic projection image can be expressed using a lens distortion ratio $D_r$ as shown below.

$$D_r = \frac{\sqrt{(x-x_c)^2 + (y-y_c)^2} - \sqrt{(x'-x'_c)^2 + (y'-y'_c)^2}}{\sqrt{(x'-x'_c)^2 + (y'-y'_c)^2}} = \frac{r-r'}{r'} \quad (1)$$

Here, $D_r$ is generally dependent on r. $D_r$ takes the best value ($D_0 \sim 0$) in the case where the object is on the optical axis of the lens, and tends to increase the farther the object is separated from the center of the optical axis of the lens.

The accuracy detection unit 102 determines the accuracy of the distortion correction performed for the lens of the imaging unit 101. In the present embodiment, the accuracy detection unit 102 obtains a maximum difference of distortion ratio, which indicates error that cannot be compensated for by distortion correction processing. For example, the accuracy detection unit 102 can obtain the difference between a lens distortion ratio approximated by a polynomial expression and a measured value of the lens distortion ratio, as the accuracy of lens distortion correction.

For example, the accuracy detection unit 102 can obtain an image height correction ratio that is to be used in distortion correction processing. As will be described later, the image conversion unit 103 of the present embodiment performs distortion correction processing with use of a distortion ratio function D(r), which is a polynomial function that approximately expresses the lens distortion ratio. The accuracy detection unit 102 can also obtain the aforementioned lens distortion ratio $D_r$, which is information that indicates the actual lens distortion ratio. The lens distortion ratio $D_r$ can be calculated based on an image of a measurement chart obtained by the imaging unit 101, for example. The lens distortion ratio $D_r$ can be obtained or measured at any timing. For example, the lens distortion ratio $D_r$ can be measured after a dome is attached to the monitoring camera, after the monitoring camera is placed in a housing, or periodically. The obtained lens distortion ratio $D_r$ can be stored in a memory (not shown) included in the imaging apparatus 100.

Generally, the distortion ratio function D(r) can be expressed as a polynomial expression of r, such as a quintic expression. The following shows one example of the distortion ratio function D(r).

$$D(r) = a\left(\frac{r}{2f}\right)^5 + b\left(\frac{r}{2f}\right)^4 + c\left(\frac{r}{2f}\right)^3 + d\left(\frac{r}{2f}\right)^2 + e\left(\frac{r}{2f}\right) + f \quad (2)$$

In this case, the distortion ratio maximum difference can be expressed as $D_r - D(r)$, and the accuracy detection unit 102 can obtain the maximum difference expressed in this way. The accuracy detection unit 102 can also obtain a distortion maximum difference Δr. For example, the accuracy detection unit 102 can obtain the distortion maximum difference Δr using the expression Δr=r×(D$_r$−D(r)). Here, the distortion ratio maximum difference pertains to a point in the input image that is the distance r from the center point, and expresses the maximum error ratio that is predicted for the distance from the center point after distortion correction.

The image conversion unit 103 performs correction on the input image such that the shape of an object image is brought closer to a shape that is homothetic to the object. For example, the image conversion unit 103 can expand the input image obtained from the imaging unit 101 into a panoramic image. For example, the image conversion unit 103 can generate a panoramic image by performing geometrical conversion processing according to the following procedure. This processing will be described below with reference to FIG. 10. First, in step S1010, the image conversion unit 103 obtains an input image from the imaging unit 101.

Process 1: Step S1020

The image conversion unit 103 obtains a distance $r_0$ from a conversion target point $(x_0, y_0)$ in the input image to the center point $(x_c, y_c)$. For example, the image conversion unit 103 obtains the distance $r_0$ using Expression 3 shown below. In FIG. 8B, assuming that the conversion target point is R, the obtained distance $r_0$ is the length of a line RP'.

$$r_0 = \sqrt{(x_0-x_c)^2 + (y_0-y_c)^2} \quad (3)$$

Process 2: Step S1030

The image conversion unit 103 obtains a distortion ratio $D(r_0)$ that corresponds to the distance $r_0$. The image conversion unit 103 can obtain the distortion ratio $D(r_0)$ by substituting the obtained distance $r_0$ into the distortion ratio function D(r), for example.

Process 3: Step S1040

The image conversion unit 103 references the distortion ratio $D(r_0)$ and performs lens distortion correction on the input image to correct distortion of the lens used by the imaging unit 101. For example, the image conversion unit 103 obtains a distance $r_0'$ between the point that corresponds to the conversion target point and the center point in the stereographic projection image. For example, the image conversion unit 103 can obtain the distance $r_0'$ with use of the distortion ratio $D(r_0)$ in Expression 4 shown below.

$$r_0' = g(r_0) = \frac{r_0}{D(r_0)+1} \quad (4)$$

Note that the processing performed here is not limited to lens distortion correction, and other types of correction processing may be performed. For example, an input image obtained through a predetermined projection method (e.g., equidistant projection) may be subjected to processing for conversion into a stereographic projection image here. In this case, instead of determining the accuracy of lens distortion correction, the accuracy detection unit 102 can determine the amount of error that remains after this correction processing, and the image conversion unit 103 can use the determined amount of error to determine a set distance $r_{th}$ as will be described later.

Process 4: Step S1050

Through processes 4 and 5, the image conversion unit 103 performs correction on the input image such that the shape of an object image is brought closer to a shape that is homothetic to the object. For example, the image conversion unit 103 can perform image conversion such that the input image obtained by the stereographic projection method is converted into a panoramic image. Here, the image conversion unit 103 performs correction in which the intensity of correction is weaker in peripheral portions of the input image than in a central portion of the input image. In process 4, the image conversion unit 103 obtains a correction coefficient for geometrical conversion. For example, the image conversion unit 103 can perform image conversion with use of a conversion function H(r) shown below.

$$H(r) = \frac{1}{1+e^{-\beta(r-r_{th})}} Z(r) + \frac{1}{1+e^{\beta(r-r_{th})}} K(r) \quad (5)$$

Here, r denotes the distance between the processing target point and the point that corresponds to the optical axis in the input image.

Also, $r_{th}$ and β are parameters that determine the weights of a conversion function Z(r) for conversion to a perspective projection and a conversion function K(r) for conversion to a stereographic projection. Specifically, in Expression 5, the weight of Z(r) is $1/(1+e^{\beta(r-r_{th})})$, and the weight of K(r) is $1/(1+e^{-\beta(r-r_{th})})$.

Figure 2B:
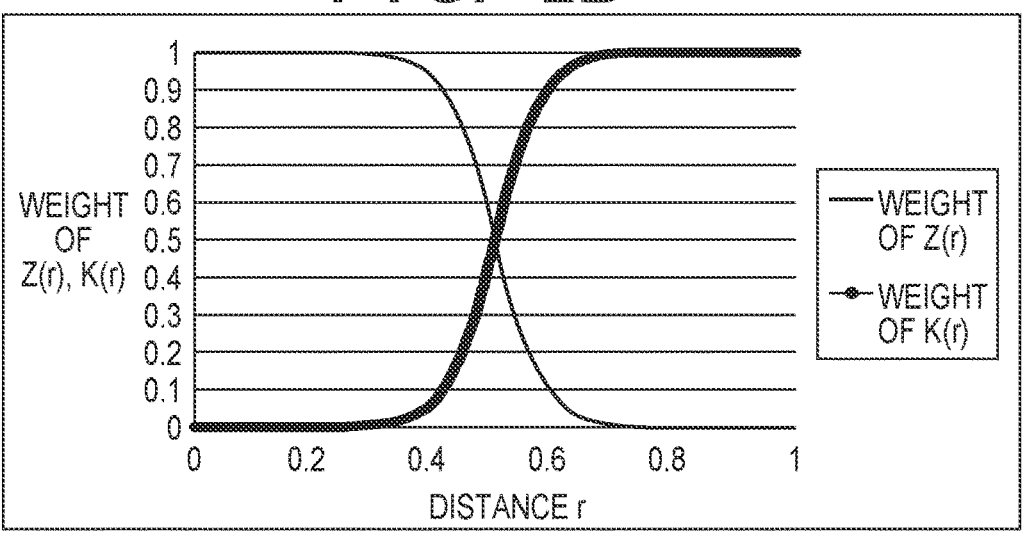
Figure 2C:
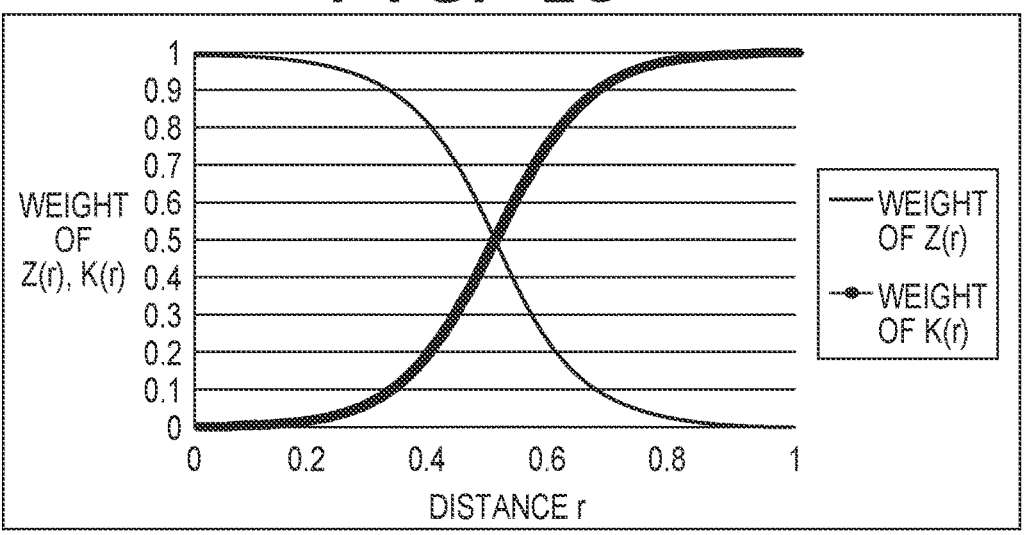

The following describes $r_{th}$ and β with reference to FIGS. 2A to 2E. FIGS. 2A to 2C show graphs in which the vertical axis represents the weights of Z(r) and K(r), and the horizontal axis represents the distance r from the center point. FIGS. 2A, 2B, and 2C respectively show cases in which β is 0.05, 0.01, and 0.005. Also, in FIGS. 2A to 2C, $r_{th}$ is 0.5. Furthermore, in FIGS. 2A to 2C, the thin line represents the weight of Z(r), and the thick line represents the weight of K(r).

As can be understood from FIGS. 2A to 2C, β shows the steepness of the switch, and the higher β is, the sharper the switch is. In this manner, β determines the size of the region in which effective weights are set for both Z(r) and K(r).

Figure 2D:
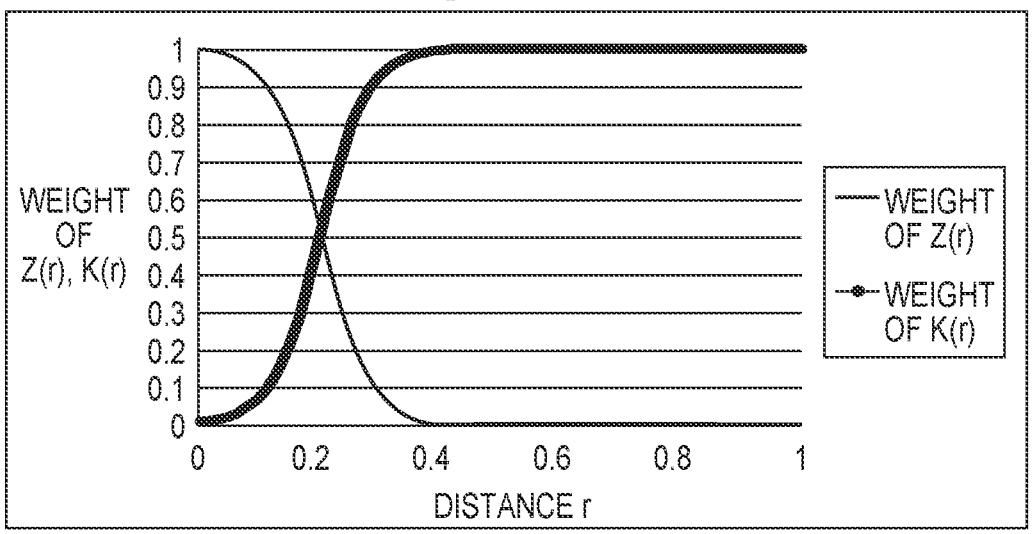
Figure 2E:
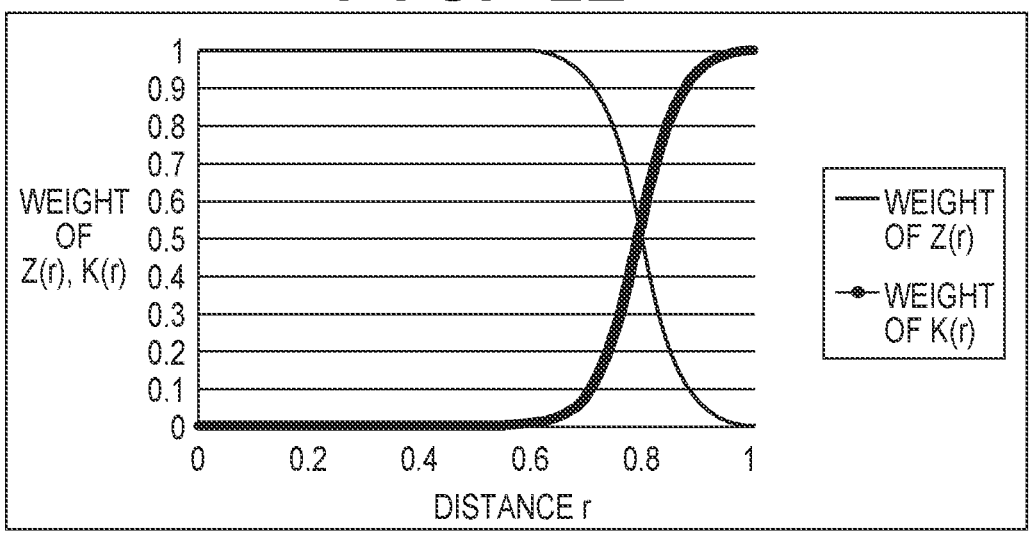

FIGS. 2D and 2E show cases in which β is 0.01. Also, in FIGS. 2D and 2E, $r_{th}$ is 0.2 and 0.8 respectively. As can be understood from FIGS. 2A to 2E, $r_{th}$ shows a boundary, and $r_{th}$ is the distance r in the case where the weights of Z(r) and K(r) are 0.5. In the case where $r_{th}$=0.5, when r rises above 0.5, K(r) becomes larger than Z(r).

Here, Z(r) and K(r) indicate image height correction coefficients. Z(r) is a conversion function for conversion from a stereographic projection to a perspective projection. Correcting the image height using Z(r) corresponds to performing conversion from a stereographic projection to a perspective projection, that is to say, performing correction on the input image such that the shape of the object image is brought closer to a shape that is homothetic to the object. Also, K(r) is a constant that is not dependent on r, and more specifically is an image height correction coefficient for conversion from a stereographic projection to a perspective projection when r=$r_{th}$. Accordingly, K(r) is a conversion function for conversion from a stereographic projection to a stereographic projection, and correcting the image height using K(r) corresponds to maintaining stereographic projection. In this way, in one embodiment, the image conversion unit 103 performs geometrical conversion in accordance with a combined conversion function in which the conversion function Z(r) for converting an image to a stereographic projection is combined with the conversion function K(r) for converting an image to a perspective projection. Z(r) and K(r) can be expressed as shown below.

$$Z(r) = \frac{4\alpha f^2 r}{4f^2 - r^2} \qquad (6)$$

$$K(r) = \frac{4\alpha f^2 r_{th}}{4f^2 - r_{th}^2} \qquad (7)$$

Here, α is the magnification ratio used for conversion to a panoramic image, and f is the focal length of the lens.

As described above, in the central portion of the input image (the region where the distance from the center point is smaller than a predetermined value), the weight of Z(r) is larger, and the input image is subjected to stronger correction for bringing the shape of the object image closer to a shape that is homothetic to the object. However, in peripheral portions of the input image (regions where the distance from the center point is larger than the predetermined value), the weight of Z(r) is smaller, and the input image is subjected to weaker correction for bringing the shape of the object image closer to a shape that is homothetic to the object.

As described above, in the region where the distance from the center point is smaller than $r_{th}$, the weight of Z(r) is larger than the weight of K(r). The object image in the portion of the panoramic image that corresponds to this region is not completely a perspective projection image, but the object image obtained by this geometrical conversion is closer to a perspective projection image. Accordingly, in this specification, the geometrical conversion performed on this region will be generally called conversion to a perspective projection. Also, in a region where the distance from the center point is larger than $r_{th}$, the weight of Z(r) is smaller than the weight of K(r). The object image in the portion of the panoramic image that corresponds to this region is not completely a stereographic projection image, but the object image obtained by this geometrical conversion is closer to a stereographic projection image. Accordingly, in this specification, the geometrical conversion performed on this region will be generally called conversion to a stereographic projection. As described above, in the present embodiment, the input image is subjected to geometrical conversion in which a region in the input image where the distance from the center point is smaller than a set distance is converted to a perspective projection, and a region where the distance from the center point is larger than the set distance is converted to a stereographic projection.

In one embodiment, as the distance from the center point increases, the image height correction coefficient converges on a given value. For example, in the case of using Expression 5, as the distance from the center point increases, the value of H(r) gradually converges on K(r). Also, in one embodiment, as the distance from the center point increases, the image height correction coefficient changes in a continuous manner. In other words, a function representing the relationship between the distance r from the center point and the image height correction coefficient H(r) is a continuous function. According to this configuration, noise is not likely to appear in the image obtained by geometrical conversion, and it is possible to improve detection accuracy when object detection processing is performed on the image obtained by geometrical conversion.

The following describes an example of a method for determining $r_{th}$. The set distance $r_{th}$ can be determined based on the accuracy of the distortion correction performed for the lens used by the imaging unit 101. Of course, either before or after correction, the image conversion unit 103 may determine the set distance $r_{th}$ based on the amount of distortion in the input image. In the present embodiment, the image conversion unit 103 determines $r_{th}$ based on the maximum difference Δr that was determined by the accuracy detection unit 102 based on the accuracy of the distortion correction performed for the lens used by the imaging unit 101. For example, in the case where the maximum difference acquired from the accuracy detection unit 102 is Δr, a maximum error Δ in the perspective projection image can be obtained using Expression 8 shown below.

$$\Delta = \frac{4\alpha f^2 (r + \Delta r)}{4f^2 - (r + \Delta r)^2} - \frac{4\alpha f^2 r}{4f^2 - r^2} \qquad (8)$$

Figure 9:
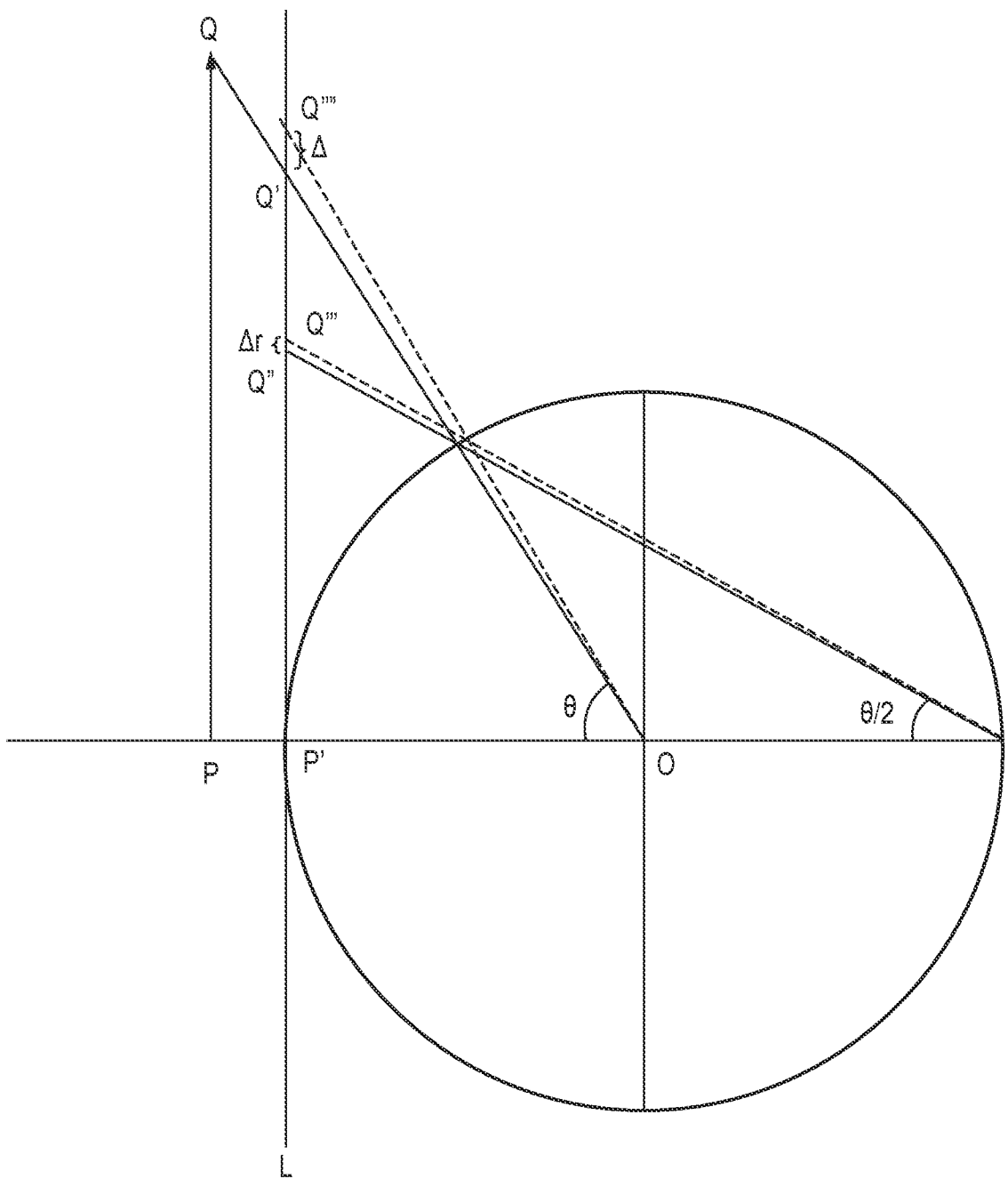
FIG. 9 is a diagram illustrating processing according to an embodiment.

The geometrical relationship between the maximum difference Δr and the maximum error Δ will be described below with reference to FIG. 9. FIG. 9 is a schematic diagram showing the object PQ projected on the projective plane L by perspective projection and by stereographic projection. When the object PQ is projected on the projective plane L by perspective projection, it becomes an image that has an image height P'Q'. Also, when the object PQ is projected on the projective plane L by stereographic projection, it becomes an image that has an image height P'Q". As described above, the position of Q' in the input image obtained by stereographic projection changes due to distortion. Specifically, in consideration of the maximum difference Δr that may remain even after performing distortion correction, the point Q in the object may appear at a point Q''' that is separated from the point Q" by Δr in the input image, and the image height of the object PQ may become P'Q'''. Here, when the input image is converted into a perspective projection image, a point Q''' in the input image is converted into a point Q'''' in the perspective projection image, that is to say, the image height of the object PQ in the perspective projection image becomes PQ''''. Accordingly, the maximum error Δ in the perspective projection image is the length of a line segment Q''''Q'.

Here, let $\Delta_{th}$ be allowable error in the perspective projection. The allowable error $\Delta_{th}$ can be determined in advance. Also, $r_{th}$ is the value of r when the maximum error Δ is the allowable error $\Delta_{th}$, and $r_{th}$ can be obtained using Expression 9 shown below.

$$\Delta_{th} = \frac{4\alpha f^2 (r_{th} + \Delta r)}{4f^2 - (r_{th} + \Delta r)^2} - \frac{4\alpha f^2 r_{th}}{4f^2 - r_{th}^2} \qquad (9)$$

Process 5: Step S1060

The image conversion unit 103 determines a coordinate value $(x_1, y_1)$ of a point in the panoramic image that corresponds to the conversion target point $(x_0, y_0)$ in the input image. Here, the image conversion unit 103 can use an image height $g(r_0)$ in the stereographic projection image and a corresponding image height $(H(g(r_0)))$ in the perspective projection image (panoramic image). The function g₀ is the above-described distortion correction function. For example, the image conversion unit 103 can determine the coordinate value of the point in the panoramic image using Expressions 10 and 11 shown below.

$$[x_1 = x_c + (x_0 - x_c) \times \frac{H(g(r_0))}{g(r_0)} \qquad (10)$$

-continued $$y_1 = y_c + (y_0 - y_c) \times \frac{H(g(r_0))}{g(r_0)} \quad (11)$$

Process 6: Step S1070

For each pixel in the input image, the image conversion unit 103 determines the coordinate value of the corresponding pixel in the panoramic image by performing the processing of processes 1 to 5. The pixel value that was determined for the pixel in the panoramic image that corresponds to the pixel in the input image is then set as the pixel value of that pixel in the input image. If a pixel in the panoramic image does not have a corresponding pixel in the input image, the image conversion unit 103 can determine a pixel value for that pixel through interpolation processing performed using the pixel values of surrounding pixels.

In step S1070, the image conversion unit 103 can output the obtained panoramic image. According to the present embodiment, it is possible to obtain a panoramic image in which error attributed to lens distortion has been suppressed to at least a certain level. In one embodiment, the imaging apparatus 100 or an external image processing apparatus can perform image analysis processing such as object detection processing on the panoramic image. According to the present embodiment, it is possible to improve the accuracy of image analysis by suppressing error attributed to lens distortion to at least a certain level.

Second Embodiment

Figure 3:
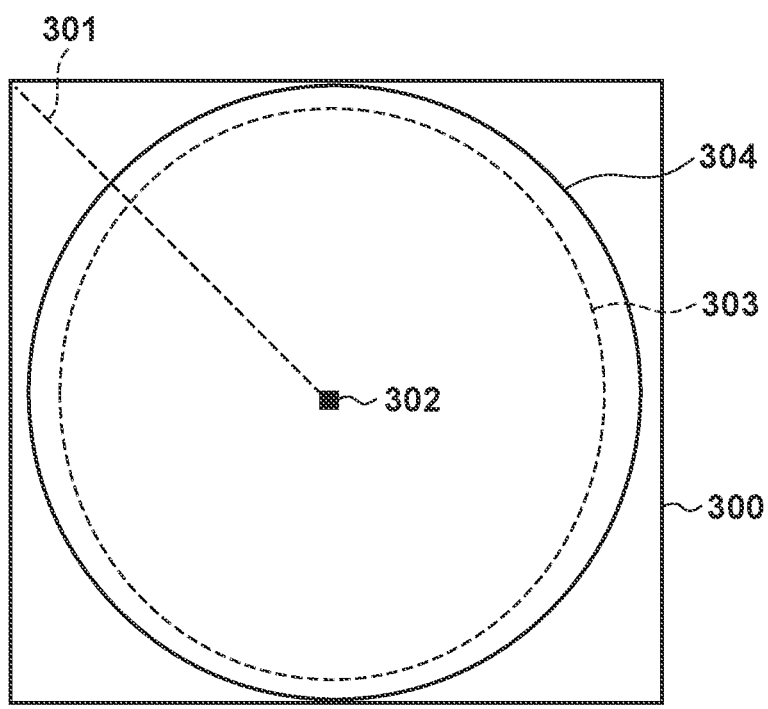
FIG. 3 is a diagram illustrating processing according to an embodiment.
Figure 4:
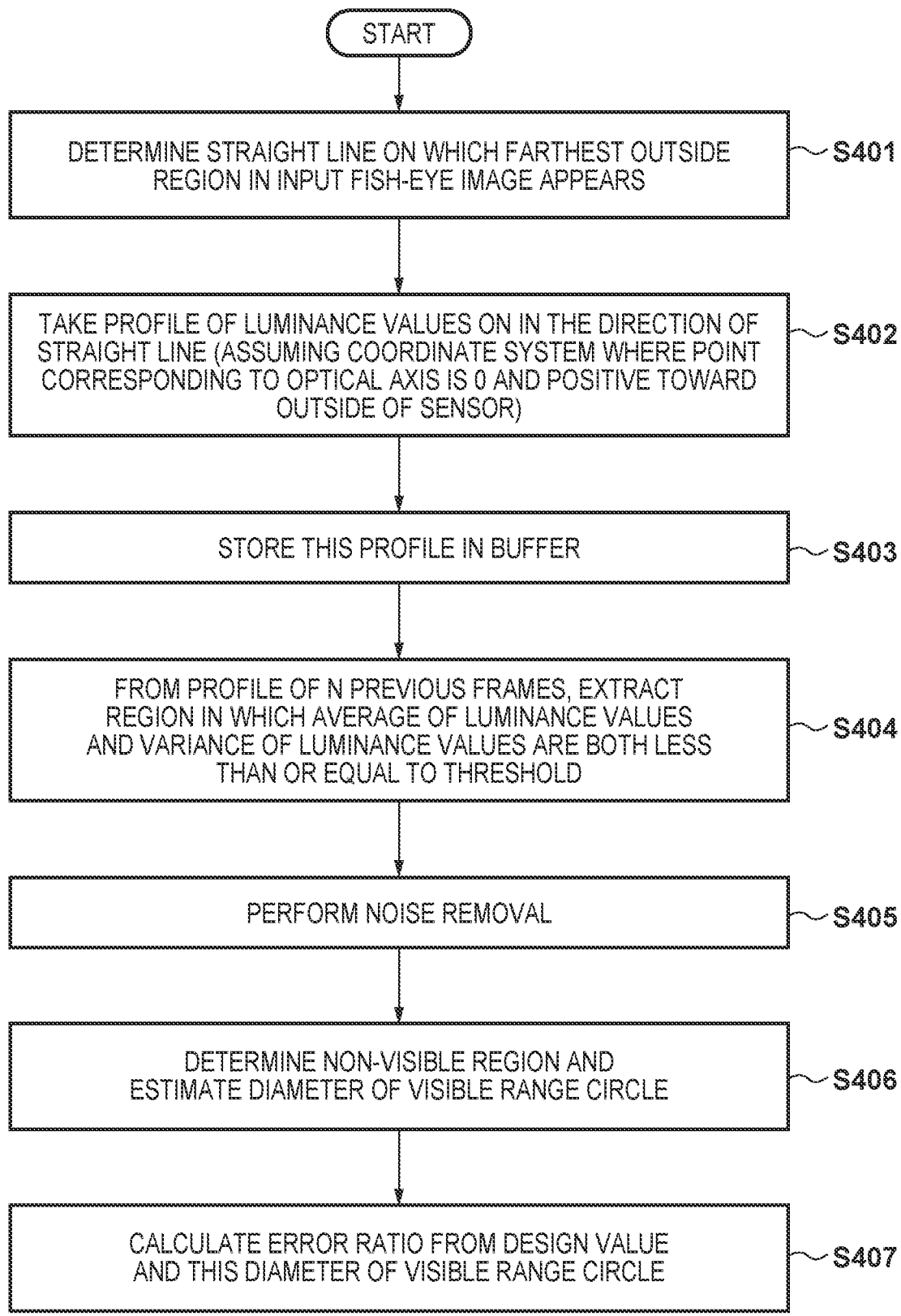
FIG. 4 is a flowchart showing an error ratio determination procedure according to an embodiment.

The following describes an imaging apparatus according to a second embodiment with reference to FIGS. 3 and 4. FIG. 3 shows an image 300 that was captured using a stereographic projection type of fisheye lens. In FIG. 3, a point 302 is a point that corresponds to the optical axis. Also, the region outside the circle indicated by a solid line 304 is a region in which objects do not appear, and this region is black. Furthermore, the region inside the circle indicated by a dashed line 303 is an object region that corresponds to a design value of the lens. A dashed line 301 is a straight line that connects the point 302 corresponding to the optical axis to the intersection of two sides that define the outer edge of the image 300.

In general, a monitoring camera is adjusted at the factory such that the visible range and the position of the point corresponding to the optical axis are within a set range, before the monitoring camera is shipped. However, it is often the case that before a monitoring camera is used, operations such as attaching a dome to the monitoring camera or placing the monitoring camera in a housing are performed depending on the user application. There are cases where as a result of such operations, the visible range corresponding to the design value indicated by the dashed line 303 and the actual visible range indicated by the solid line 304 deviate from each other as shown in FIG. 3. If projection conversion for conversion to a perspective projection (panoramic image) is performed in such a situation, the amount of error attributed to distortion correction can possibly increase even higher in the panoramic image.

In the present embodiment, error in the panoramic image is reduced due to the accuracy detection unit 102 shown in FIG. 1 determining the visible range in the input image and outputting, to the image conversion unit, accuracy information indicating the amount of deviation from the visible range design value. For example, the accuracy detection unit 102 can estimate the radius of a circle that indicates the visible range in the input image based on the distribution of luminance values in the input image.

FIG. 4 is a flowchart showing an example of a procedure according to which the accuracy detection unit 102 of the imaging apparatus 100 according to the second embodiment determines the accuracy of the imaging apparatus 100. In the present embodiment, the accuracy detection unit 102 determines the diameter of the visibility circle in the input image. The set distance $r_{th}$ is then determined using the ratio between the determined visibility circle diameter and the design value of the visibility circle diameter. The imaging apparatus 100 can use this obtained set distance $r_{th}$ to perform geometrical conversion in accordance with the flowchart in FIG. 10.

In step S401, the accuracy detection unit 102 sets a straight line that extends outward from the point corresponding to the optical axis in a fisheye image that is the input image. The accuracy detection unit 102 of the present embodiment determines a straight line that extends from this point to the farthest point in the region outside of the imaging range. For example, the accuracy detection unit 102 can determine a straight line (dashed line 301) that connects the intersection point of two sides that define the outer edge of the input image and the point corresponding to the optical axis. In the case where the outer edge of the input image is defined by sides that have the same length as shown in FIG. 3, the accuracy detection unit 102 may determine a straight line that connects the point corresponding to the optical axis and any of the remaining three intersection points. On the other hand, in the case where the sensor position has been adjusted, the position of the point corresponding to the optical axis has been corrected, or the like, the accuracy detection unit 102 can select the straight line with consideration given to the adjusted value.

Figure 5:
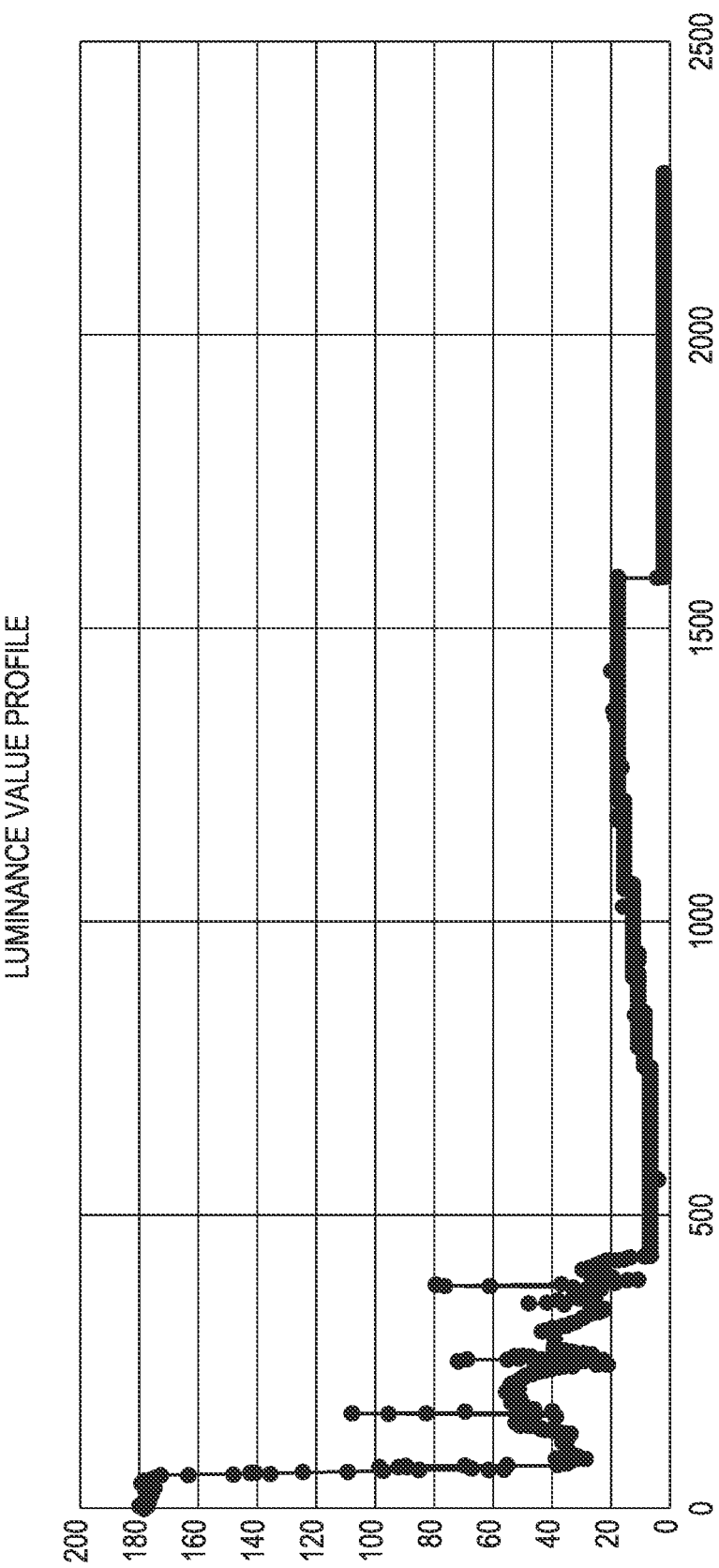
FIG. 5 is a diagram illustrating a luminance value profile that is used in an embodiment.

In step S402, the accuracy detection unit 102 creates a profile with use of the luminance values of the pixels on the straight line. FIG. 5 shows an example of this profile. In this profile, the pixel positions are plotted on the horizontal axis, and the luminance values of the pixels are plotted on the vertical axis. The values showing the pixel position on the horizontal axis increase the farther the pixel is from the point corresponding to the optical axis. More specifically, the coordinate value of the point corresponding to the optical axis is 0, and the coordinate value of the point that is the farthest from that point outside of the imaging region (e.g., the intersection point between two sides that define the outer edge of the input image) is the largest value (e.g., 2300).

In step S403, the accuracy detection unit 102 stores the profile that was created in step S402 in a buffer (not shown). In step S404, the accuracy detection unit 102 uses the profiles of N previous frames stored in the buffer to calculate the average and the variance of the luminance values at the pixel positions. The accuracy detection unit 102 then generates a numerical value string that indicates evaluation values of the luminance values. The numerical value at a position x in the numerical value string is 1 if the average and the variance of the pixel corresponding to the coordinate value x fall below a predetermined threshold value, and is 0 if otherwise.

In step S405, the accuracy detection unit 102 uses low pass filter processing for example to remove noise from the numerical value string that was created in step S404. A digital filter such as FIR or IIR can be used as the low pass filter. In step S406, the accuracy detection unit 102 determines a non-visible region on the straight line. For example, the accuracy detection unit 102 can specify the most inward pixel of the non-visible region. Here, the pixels from the specified pixel to the pixel having the highest coordinate value all have an evaluation value of 1. Furthermore, the accuracy detection unit 102 can obtain the distance from the point corresponding to the optical axis to the most inward pixel of the non-visible region of the input image as the visibility circle diameter.

In step S407, using Expression 12 shown below, the accuracy detection unit 102 determines the error ratio $D_R$ with use of the ratio between the obtained visibility circle diameter and the design value of the visibility circle diameter.

$$D_R = \frac{r - r'}{r'} \quad (12)$$

In the above expression, r is the visibility circle diameter, and r' is the design value of the visibility circle diameter.

The thus-obtained error ratio $D_R$ can be used in place of the lens distortion ratio $D_r$ described in the first embodiment. According to the present embodiment, it is possible to determine the maximum difference $\Delta r$ and the allowable error $\Delta th$ and also set the set distance $r_{th}$ without using a measurement chart. For this reason, it is possible to easily realize the suppression of error caused by degradation of the imaging apparatus 100 (e.g., degradation of the dome).

Third Embodiment

Figure 6:
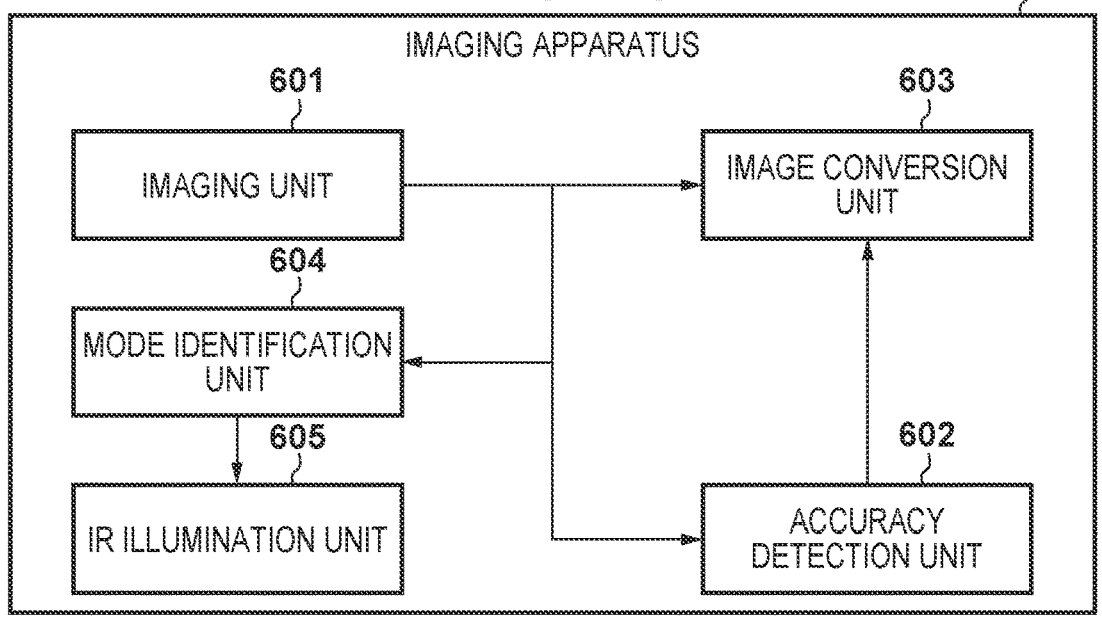
FIG. 6 is a block diagram of an imaging apparatus according to an embodiment.
Figure 7:
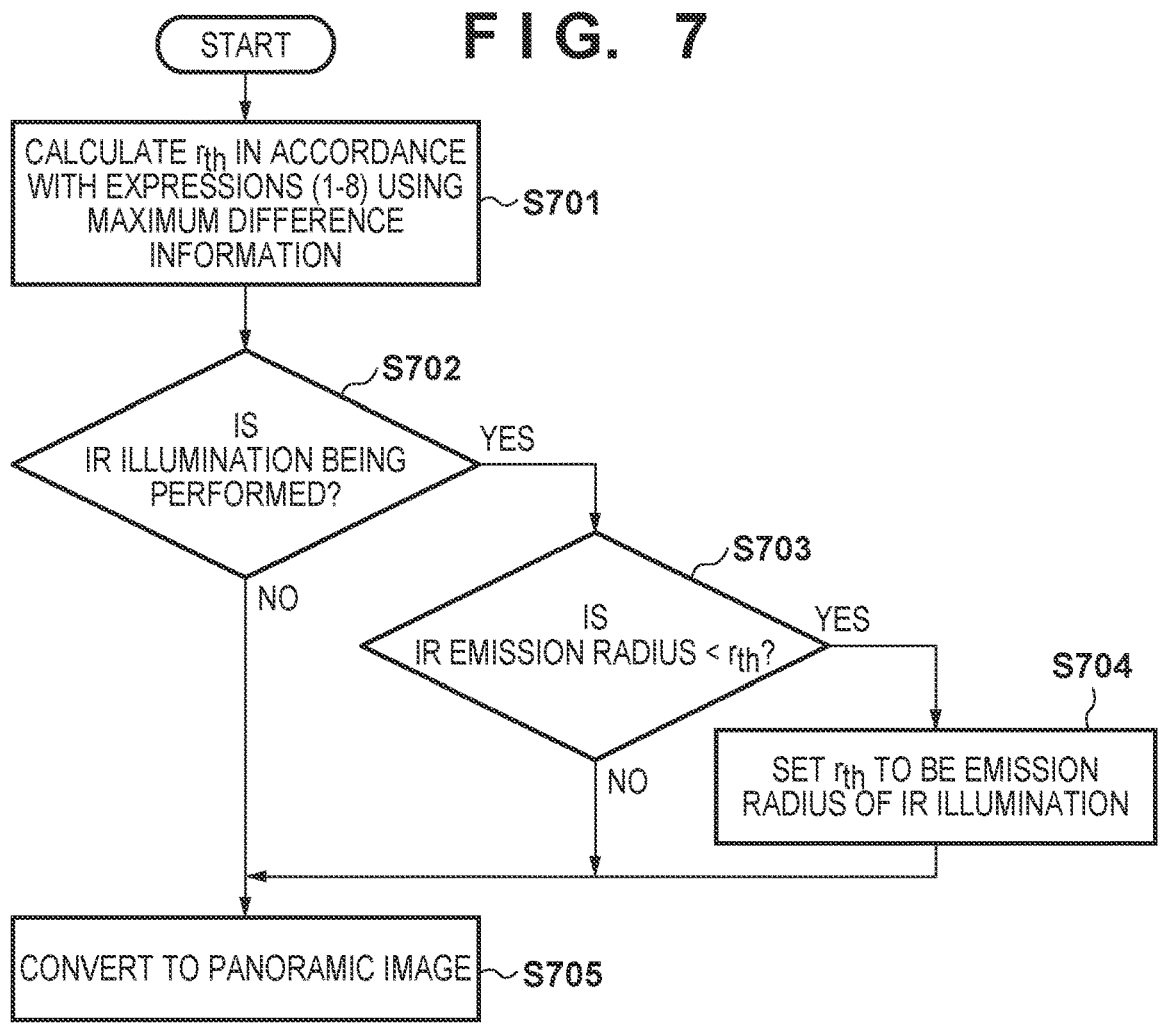
FIG. 7 is a flowchart showing a procedure for determining a set distance according to an embodiment.

The following describes an example of the configuration of an imaging apparatus according to a third embodiment with reference to FIGS. 6 and 7. FIG. 6 is a block diagram showing an example of the configuration of the imaging apparatus according to the third embodiment. An imaging apparatus 600 has an imaging unit 601, an accuracy detection unit 602, an image conversion unit 603, a mode identification unit 604, and an IR illumination unit 605. In the case of determining that the surrounding environment is dark, the imaging apparatus 600 can maintain the quality of a captured input image by performing IR (infrared light) image capturing.

The imaging unit 601 is similar to the imaging unit 101 of the first embodiment, but includes an IR cut filter and a mechanism for insertion and retraction thereof. The accuracy detection unit 602 is similar to the accuracy detection unit 102 of the first embodiment, and therefore will not be described. The image conversion unit 603 converts an input image obtained from the imaging unit 601 into a panoramic image. The image conversion unit 603 performs processing that is similar to that of the image conversion unit 103 of the first embodiment, and furthermore changes the image conversion processing in accordance with mode information obtained from the mode identification unit 604.

The mode identification unit 604 determines whether or not IR image capturing is to be performed. In the present embodiment, two modes are used, namely an IR image capturing mode in which images are captured while performing IR illumination, and a visible light image capturing mode in which images are captured without performing IR illumination. The mode identification unit 604 can make this determination based on the illumination level in the object environment. The mode identification unit 604 can also control the imaging unit 601 and the IR illumination unit 605 so as to perform or not perform IR illumination in accordance with the determination result. For example, the mode identification unit 604 can detect the illumination level in the object environment, and determine whether it is nighttime during which IR illumination is necessary, or daytime during which IR illumination is not necessary. The mode identification unit 604 may determine the illumination level with use of an illumination level sensor, or may determine the illumination level with use of an input image obtained from the imaging unit 601. In the case of performing IR illumination, such as the case where the mode identification unit 604 determined that the surrounding environment is dark, the IR illumination unit 605 emits IR light, and the imaging unit 601 removes the IR cut filter from the optical system. Also, in the case of not performing IR image capturing, the IR illumination unit 605 does not emit IR light, and the imaging unit 601 inserts the IR cut filter into the optical system. The mode identification unit 604 can also provide the image conversion unit 603 with mode information that indicates whether or not IR illumination is being performed.

FIG. 7 is a flowchart showing an example of a procedure performed by the image conversion unit 603 in the present embodiment. In the present embodiment, when IR image capturing is performed, the set distance $r_{th}$ is less than or equal to the IR emission radius. In the present embodiment, the image conversion unit 603 uses mode information obtained from the mode identification unit 604 and maximum difference information obtained from the accuracy detection unit 602 to generate a panoramic image from an input image obtained from the imaging unit 601.

In step S701, the image conversion unit 603 obtains $\Delta r_{th}$ using the maximum difference $\Delta r$ obtained from the accuracy detection unit 602, as shown in Expression 9. In step S702, the image conversion unit 603 determines whether or not IR illumination is being performed based on the mode information obtained from the mode identification unit 604. If IR illumination is being performed, the processing moves to step S703, and if not, the processing moves to step S705.

In step S703, the image conversion unit 603 compares the IR emission radius and $r_{th}$ that was obtained in step S701. If the IR emission radius is smaller than $r_{th}$, the processing moves to step S704, and if not, the processing moves to step S705. Information indicating the IR emission radius can be stored in advance by the imaging apparatus 600. In step S704, the image conversion unit 603 sets the value of $r_{th}$ as the emission radius in IR illumination.

Figure 10:
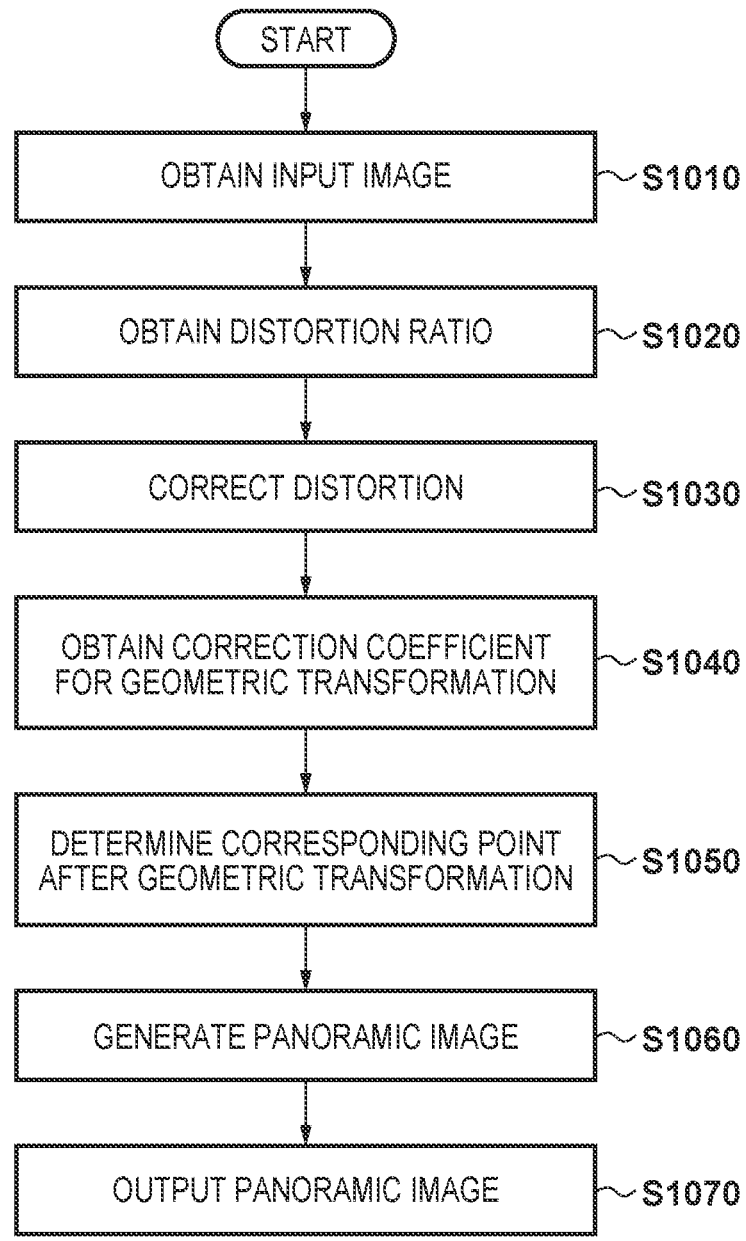
FIG. 10 is a flowchart showing a processing procedure according to an embodiment.

In step S705, the image conversion unit 603 generates a panoramic image in accordance with the flowchart in FIG. 10.

According to the present embodiment, when IR illumination is performed, if the IR emission radius is smaller than $r_{th}$, the IR illumination region is subjected to conversion from a stereographic projection to a perspective projection. It is therefore possible to reduce the calculation load, and increase the calculation load in post-processing that accompanies an increase in noise.

Other Embodiments

An information processing apparatus according to an embodiment of the present invention has the image conversion unit 103 or 603. Also, the information processing apparatus according to this embodiment of the present invention may be configured without the imaging unit 101. In such an embodiment, the image conversion unit 103 or the 603 can obtain the input image captured using a fisheye lens from an imaging apparatus. Also, the information processing apparatus according to this embodiment of the present invention or the above-described imaging apparatuses may be configured without the accuracy detection unit 102. In such an embodiment, the image conversion unit 103 or 603 can obtained parameters such as the maximum difference Δr, the allowable error $\Delta_{th}$, and the visibility circle diameter r from a memory (not shown). Also, these parameters may be determined by a processing apparatus (not shown) based on a fisheye image obtained by the imaging unit 101 or another imaging apparatus that has a fisheye lens, and may be stored in a memory (not shown) of the information processing apparatus or the other imaging apparatus.

Also, the image conversion unit 103 or 603 does not need to perform geometrical conversion in accordance with the method described above. For example, the image conversion unit 103 or 603 may perform geometrical conversion with reference to a look up table. For example, it is possible to use a look up table that gives $H(g(r_0))/g(r_0)$ shown in Expressions 10 and 11 for the distance $r_0$ from the center point. It is also possible to use a look up table that gives $(x_1, y_1)$ according to Expressions 10 and 11 for the coordinates $(x_0, y_0)$ of the conversion target point. In this case, the look up table may be updated at an appropriate timing by the image conversion unit 103 or 603, the accuracy detection unit 102 or 602, or the processing apparatus (not shown). In this case, the look up table can be updated so as to reflect the most recent accuracy of lens distortion correction, using parameters such as the maximum difference Δr, the allowable error $\Delta_{th}$, or the visibility circle diameter r, as described in the first to third embodiments.

Also, the method for setting the set distance $r_{th}$ is not limited to the method described above. For example, in the case of an object that is located at the set distance from the center point of the input image, the image conversion unit 103 or 603 can set the set distance such that the error in lens distortion correction in perspective projection does not exceed the maximum error in lens distortion correction in stereographic projection. Here, the error in lens distortion correction in perspective projection can be determined based on Z(r), which indicates the image height correction coefficient shown in Expression 6 for conversion from a stereographic projection to a perspective projection, and the maximum difference Δr of distortion ratio. Also, the maximum error in lens distortion correction in stereographic projection may be the maximum difference $\Delta r_{max}$ of distortion ratio in the end portions of the input image. In this case, $r_{th}$ can be determined such that $\Delta r \times Z(r) \times (r_{th}/2f)$ does not exceed $\Delta r_{max}$, for example. For example, $r_{th}$ can be determined such that $\Delta r \times Z(r) \times (r_{th}/2f) = \Delta r_{max}$. According to this method, it is possible to sufficiently reduce the amount of error in the image resulting from geometrical conversion.

In one embodiment, the set distance $r_{th}$ is different between when performing visible light image capturing and when performing IR image capturing. In general, the lens distortion ratio is different between when performing visible light image capturing and when performing IR image capturing. Accordingly, parameters such as the value of the distortion ratio function D(r) and the maximum difference Δr may be different between when performing visible light image capturing and when performing IR image capturing. In view of this, the image conversion unit 103 can determine the set distance $r_{th}$ that is to be used when performing visible light image capturing and the set distance $r_{th}$ that is to be used when performing IR image capturing. In this case, the image conversion unit 103 can switch the geometrical conversion processing so as to use a different set distance $r_{th}$ in accordance with whether or not visible light image capturing is being performed or whether or not IR image capturing is being performed.

Figure 11:
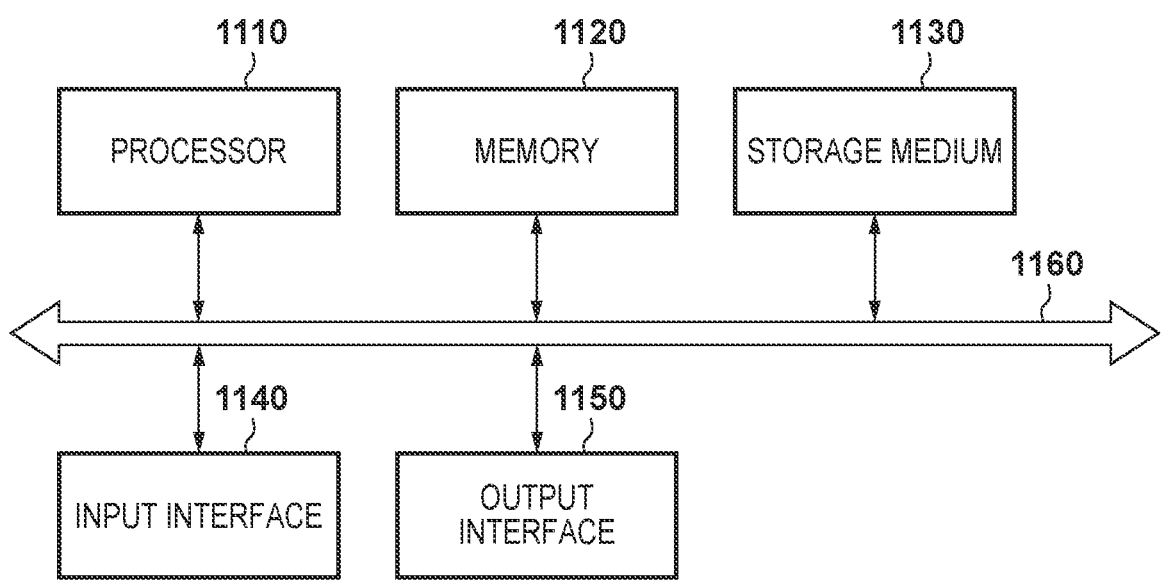
FIG. 11 is a block diagram showing a configuration of a computer according to an embodiment.

In the embodiments described above, processing units such as the image conversion unit 103 or 603, the accuracy detection unit 102, and the mode identification unit 604 are realized by dedicated hardware. However, some or all of these processing units may be realized by a computer. FIG. 11 is a diagram showing an example of the basic configuration of such a computer. A processor 1110 in FIG. 11 is a CPU for example, and performs overall control of operations of the computer. A memory 1120 is a RAM or the like, and temporarily stores programs, data, and the like. A computer-readable storage medium 1130 is a hard disk, a CD-ROM, or the like, and performs long-term storage of programs, data, and the like. In the present embodiment, a program that is stored in the storage medium 1130 and realizes the functions of various units is read out to the memory 1120. The processor 1110 then operates in accordance with the program in the memory 1120, thus realizing the functions of various units.

In FIG. 11, an input interface 1140 is an interface for obtaining information from an external apparatus. Also, an output interface 1150 is an interface for outputting information to an external apparatus. A bus 1160 is connected to the above-described units, and enables the exchange of data therebetween.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-056749, filed Mar. 23, 2018, which is hereby incorporated by reference herein in its entirety.

What is claimed is:
1. An imaging apparatus comprising:
 an imaging unit configured to capture an image with use of a fisheye lens; and an image conversion unit configured to convert an input image obtained from the imaging unit into a panoramic image, by performing geometrical conversion on the input image such that a region of the input image in which a distance from a point on an optical axis is smaller than a set distance becomes a perspective projection, and such that a region in which the distance is larger than the set distance becomes a stereographic projection, wherein the set distance is determined based on an accuracy of fisheye lens distortion correction with respect to the fisheye lens.

2. The imaging apparatus according to claim 1, wherein the fisheye lens is a stereographic projection lens.

3. The imaging apparatus according to claim 1, wherein the image conversion unit is further configured to perform the geometrical conversion in accordance with a combined conversion function in which a conversion function for conversion of an image to a stereographic projection is combined with a conversion function for conversion to a perspective projection.

4. The imaging apparatus according to claim 3, wherein the combined conversion function is expressed by H(r) shown below $$H(r) = \frac{1}{1+e^{-\beta(r-r_{th})}}Z(r) + \frac{1}{1+e^{\beta(r-r_{th})}}K(r) \quad (5)$$

where r is a distance between a processing target point in the input image and a point corresponding to the optical axis, Z(r) is the conversion function for conversion to a perspective projection, K(r) is the conversion function for conversion to a stereographic projection, $r_{th}$ is the set distance, and β is a parameter for determining weights of the conversion function for conversion to a stereographic projection and the conversion function for conversion to a perspective projection.

5. The imaging apparatus according to claim 1, further comprising an accuracy detection unit configured to determine the accuracy of fisheye lens distortion correction.

6. The imaging apparatus according to claim 5, wherein the accuracy detection unit is further configured to determine a visibility circle diameter in the input image, and the image conversion unit is further configured to determine the set distance with use of a ratio of the visibility circle diameter and a design value of the visibility circle diameter.

7. The imaging apparatus according to claim 5, wherein the image conversion unit is further configured to set the set distance such that, in a case of an object located at the set distance from the point on the optical axis in the input image, an error in fisheye lens distortion correction in the perspective projection does not exceed a maximum error in fisheye lens distortion correction in the stereographic projection.

8. The imaging apparatus according to claim 1, wherein the set distance is different between when performing visible light image capturing and when performing IR image capturing.

9. The imaging apparatus according to claim 8, wherein the set distance when performing IR image capturing is less than or equal to an IR emission radius.

10. The imaging apparatus according to claim 1, wherein the accuracy of fisheye lens distortion correction is expressed by a difference between a fisheye lens distortion ratio that is approximated by a polynomial expression and a measured value of the fisheye lens distortion ratio.

11. The imaging apparatus according to claim 1, wherein the image conversion unit is further configured to perform the geometrical conversion with reference to a look up table.

12. An image processing apparatus comprising:
an image conversion unit configured to obtain an input image that was captured with use of a fisheye lens, and perform correction on the input image such that a shape of an image of an object is brought closer to a shape that is homothetic to the object,
wherein an intensity of the correction is weaker in a peripheral portion of the input image than in a central portion of the input image.

13. An image processing method comprising:
obtaining an input image which is captured with use of a fisheye lens; and
converting the input image into a panoramic image, by performing geometrical conversion on the input image such that a region of the input image in which a distance from a point on an optical axis is smaller than a set distance becomes a perspective projection, and such that a region in which the distance is larger than the set distance becomes a stereographic projection,
wherein the set distance is determined based on an accuracy of fisheye lens distortion correction with respect to the fisheye lens.

14. A non-transitory computer-readable medium storing a program which, when executed by a computer comprising a processor and a memory, causes the computer to:
obtain an input image which is captured with use of a fisheye lens; and
convert the input image into a panoramic image, by performing geometrical conversion on the input image such that a region of the input image in which a distance from a point on an optical axis is smaller than a set distance becomes a perspective projection, and such that a region in which the distance is larger than the set distance becomes a stereographic projection,
wherein the set distance is determined based on an accuracy of fisheye lens distortion correction with respect to the fisheye lens.

* * * * *